Aug. 17, 1926.
L. A. OSGOOD ET AL
SCALE
Filed July 11, 1924
1,596,547
6 Sheets-Sheet 1
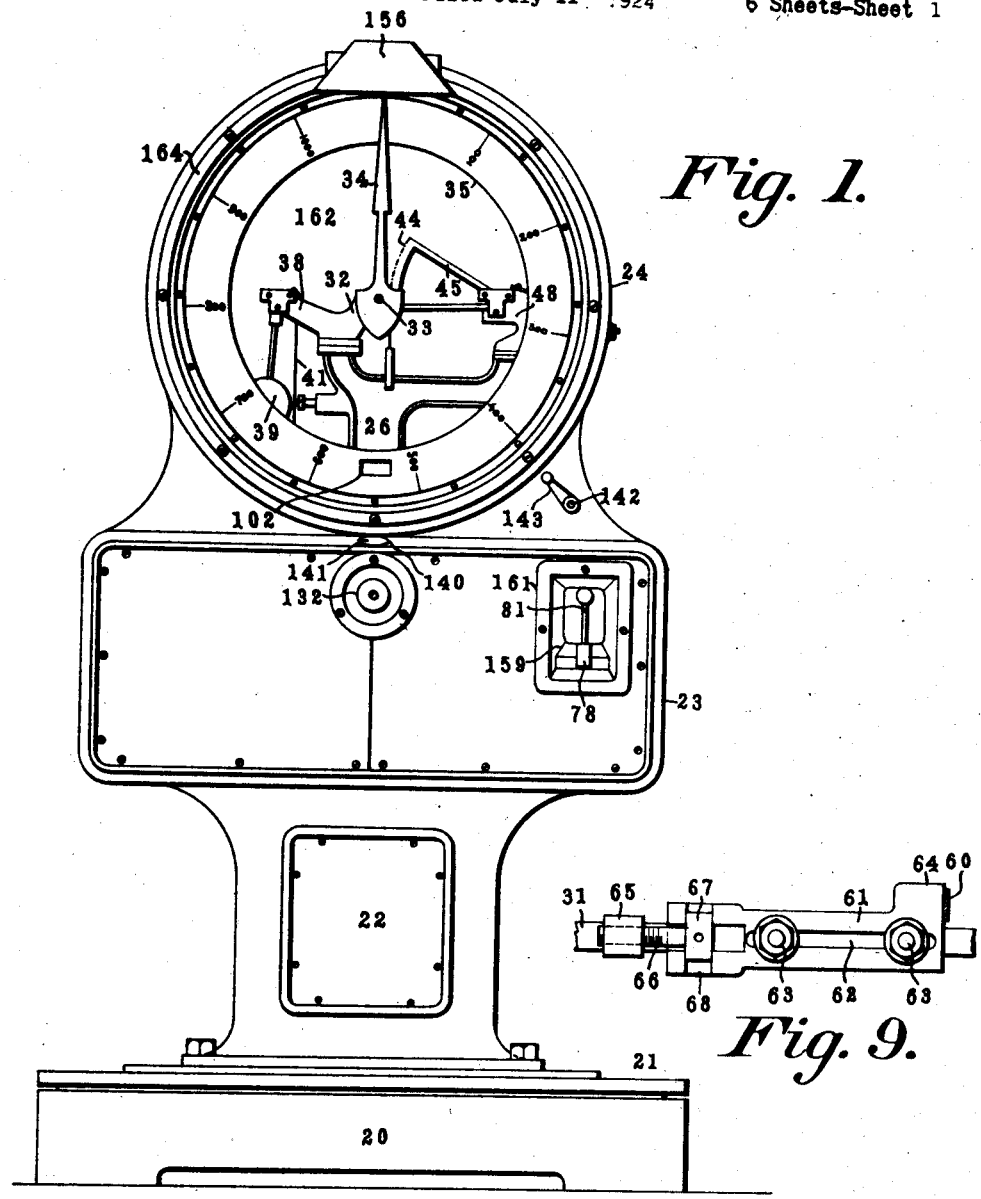
Fig. 1.
Fig. 9.
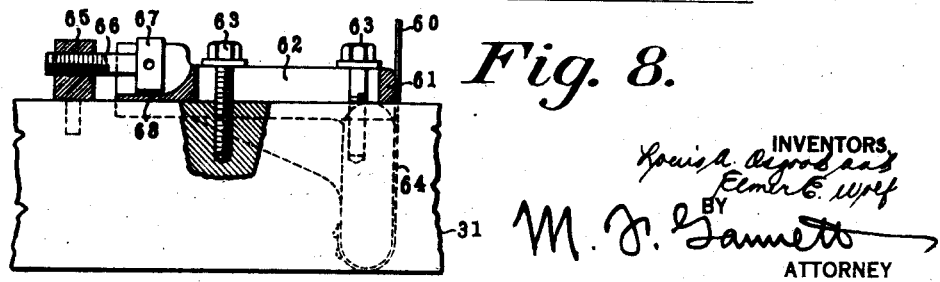
Fig. 8.
INVENTORS
Louis A. Osgood and
Elmer E. Wolf
BY
M. J. Gannett
ATTORNEY

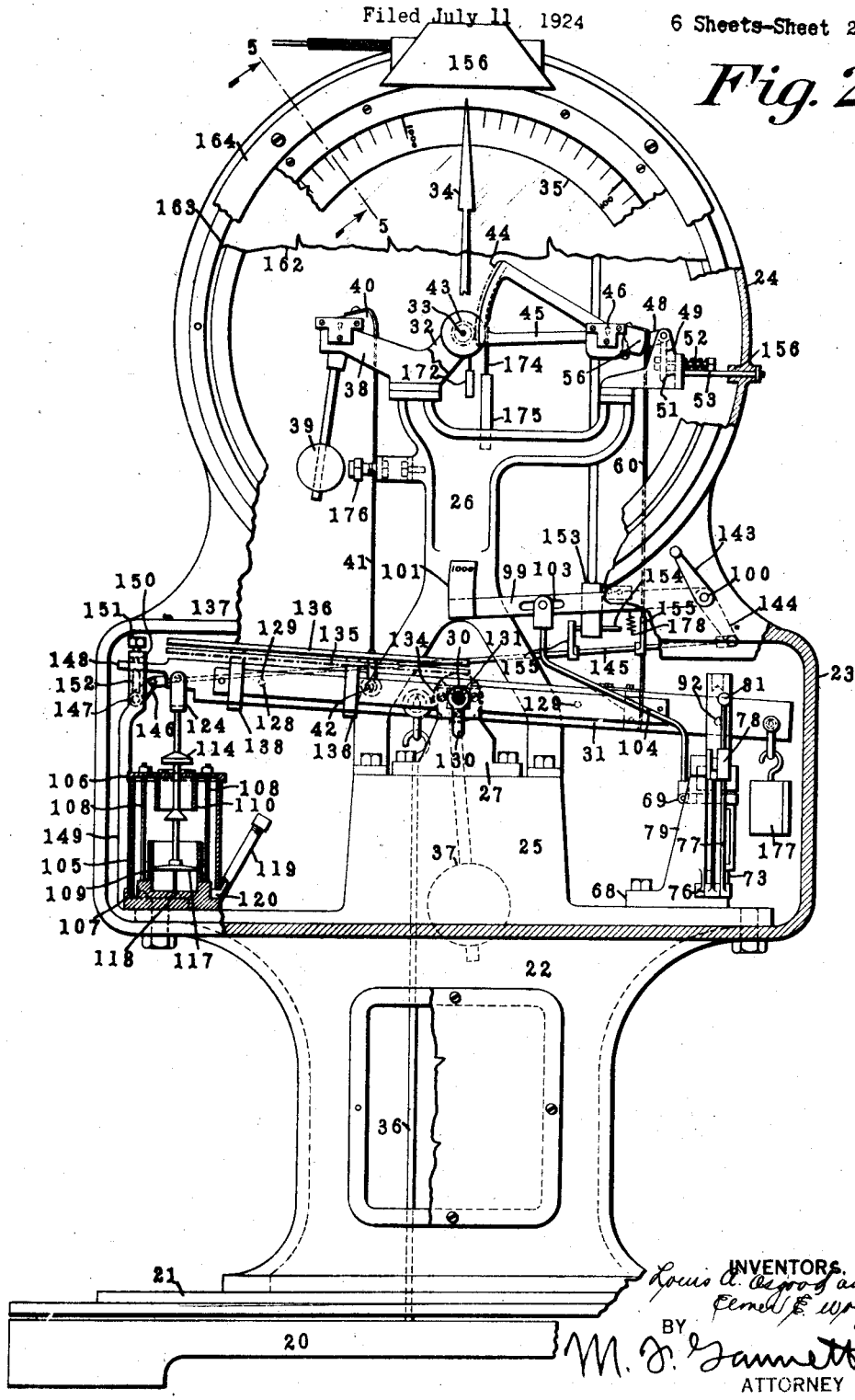

Aug. 17, 1926. 1,596,547
L. A. OSGOOD ET AL
SCALE
Filed July 11, 1924 6 Sheets-Sheet 3
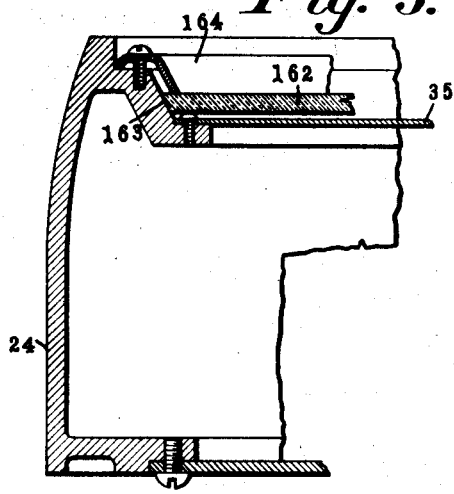
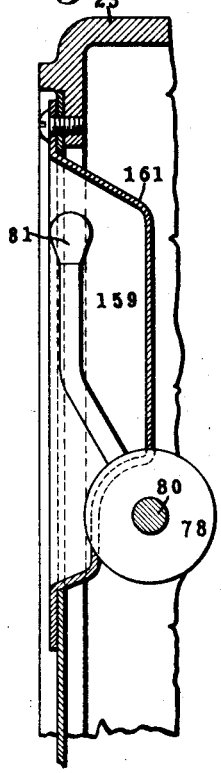
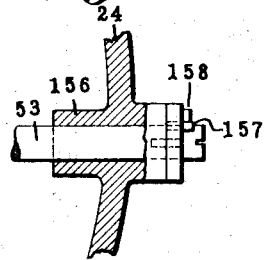
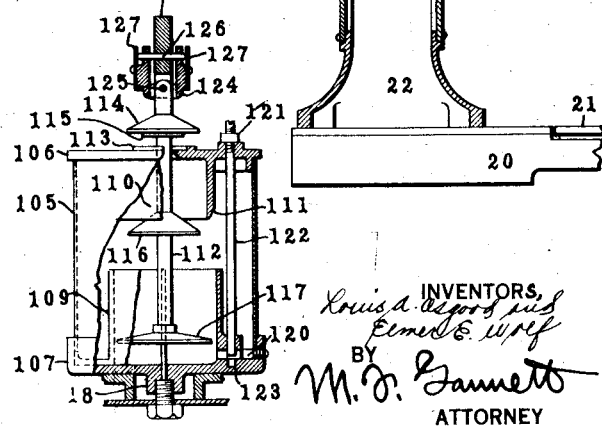

Aug. 17, 1926.  
L. A. OSGOOD ET AL  
1,596,547  
SCALE  
Filed July 11, 1924    6 Sheets-Sheet 4

INVENTORS  
BY  
ATTORNEY

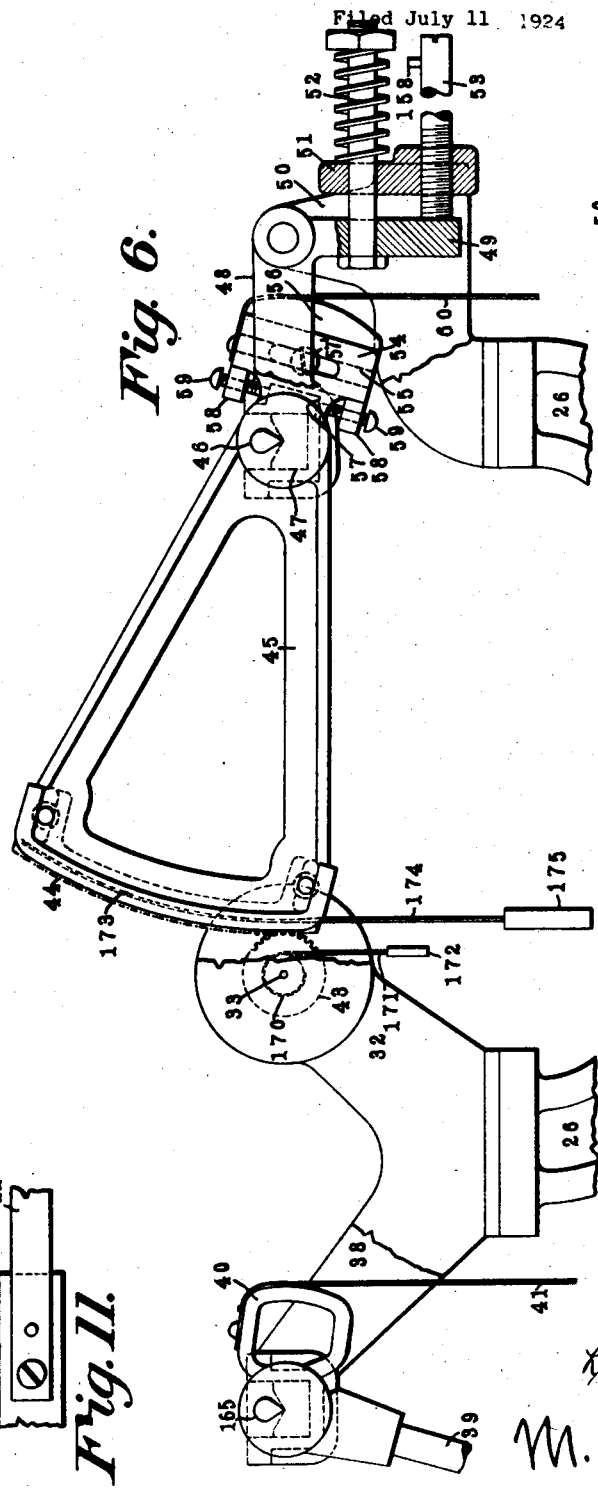

Aug. 17, 1926.

L. A. OSGOOD ET AL 1,596,547

SCALE

Filed July 11, 1924    6 Sheets-Sheet 6

INVENTOR
Louis A. Osgood
and Elmer E. Wolf
BY
M. F. Barnett
ATTORNEY

Patented Aug. 17, 1926.

1,596,547

UNITED STATES PATENT OFFICE.

LOUIS A. OSGOOD, OF HARTFORD, CONNECTICUT, AND ELMER E. WOLF, OF SPRINGFIELD, OHIO, ASSIGNORS TO E. AND T. FAIRBANKS & COMPANY, OF ST. JOHNSBURY, VERMONT, A CORPORATION OF VERMONT.

SCALE.

Application filed July 11, 1924. Serial No. 725,359.

This invention relates to a scale and aims to provide a device presenting certain improvements over weighing mechanisms as heretofore constructed.

It is the object of the present invention to furnish an article of the character stated which will be of such construction that the same may be used over long periods of time without it being necessary to clean, adjust or replace the mechanisms or other portions thereof.

It is a further object of the invention to provide a scale in which upon the parts having once been properly set, the weight value of a load, as registered by the scale, may be relied upon, despite the fact that the mechanism may be actuated by an inexperienced operator and the scale may be subjected to strains, which in the case of a conventional scale, would ordinarily be conducive to greater or less inaccuracy on the part of the registered result.

A still further object is to be predicated to the construction of a device of the character stated, the range of which may be correctly adjusted by a scale tester or inspector in order to properly correlate the actions of the scale mechanism and in which, after the parts are set and sealed, it will be virtually impossible to tamper with the scale mechanism.

Another object is that of furnishing a weighing mechanism having a relatively great capacity and capable of weighing articles of widely different weight values and in which the registered result may be relied upon, irrespective of the fact that the article may represent either a small load or an extremely large one.

Still another object is that of providing a construction which may be incorporated in the scale and by means of which an improved tare system will be furnished.

The inventors also contemplate the construction of a scale the parts of which may be adjusted to vary the acuteness of the response on the part of the mechanism.

An additional object is that of providing a scale which will efficiently perform the purpose for which it is intended, and which will also be economically and readily manufactured and assembled.

Other objects of the invention will in part be obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawing, in which:

Figure 1 is a front view of a scale embracing one view of the design and mechanism of the present invention;

Figure 2 is a view similar to Fig. 1 but showing certain of the exterior parts of the scale broken away to disclose the underlying structures;

Fig. 3 is a sectional side view of the scale with portions of the mechanism removed therefrom;

Fig. 5 is an enlarged sectional fragmentary view taken along the lines 5—5 and in the direction of the arrows indicated in Fig. 2;

Fig. 6 is a fragmentary front elevation showing details of the registering mechanism, as well as one of the scale adjustments, which may be utilized.

Fig. 7 is a plan view of certain of the parts shown in Fig. 6;

Fig. 8 is a fragmentary partly sectional view of an adjustable connecting member which may be utilized;

Fig. 9 is a plan view thereof;

Fig. 10 is a fragmentary view of still another adjustment which may be employed;

Fig. 11 illustrates a desirable method of attaching one end of a connecting member to certain of the scale mechanism;

Fig. 15 illustrates the association of the counterpoise controlling member with the scale housing;

Fig. 19 is a partly sectional view of the dash pot construction.

Figure 4:
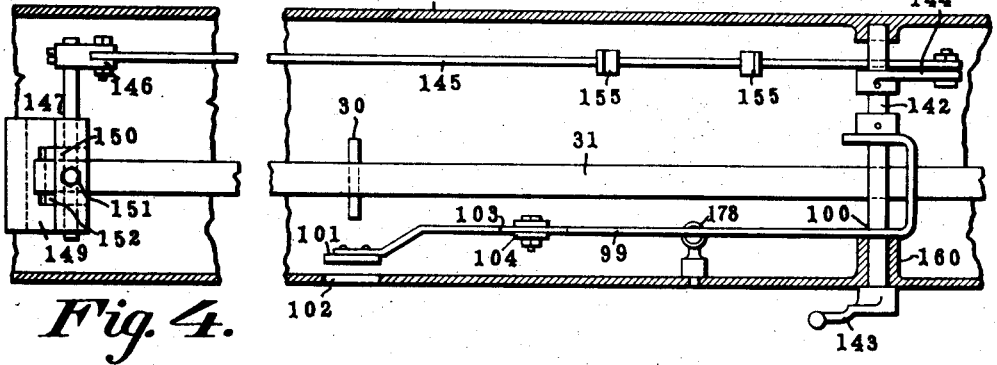
Fig. 4 is a fragmentary sectional plan view of the device showing parts of the mechanism which may be employed in connection with the locking and registering units thereof.

In the accompanying drawings there has been illustrated a beamed platform scale having a registering mechanism including a dial and pointer. It is to be understood, however, that the subject matter of the present invention may be found to be of value in connection with various types of scales and hence it will be appreciated that the subsequent specification refers to a device which merely represents one practical employment of the invention and the latter is ordinarily not to be construed as limited by the scope of the present illustration.

Attention being particularly invited to Figs. 1 and 2, it will be noted that the reference numeral 20 indicates the base of the scale upon which a platform 21 is suitably supported, this base further supporting a housing 22 having at its upper end an enlarged portion 23 for the accommodation of the scale mechanism, and carrying at a point above this enlarged portion a dial housing 24 within which the registering mechanism may be disposed. Within the housing, and more particularly the enlarged portion 23 thereof, there is provided a mounting bed a block 25 for supporting the scale mechanism and carried by this bed and extending above the same is what might be termed a superstructure, generally indicated at 26, which extends through and beyond the housing 23 and into the dial housing 24.

Figure 17:
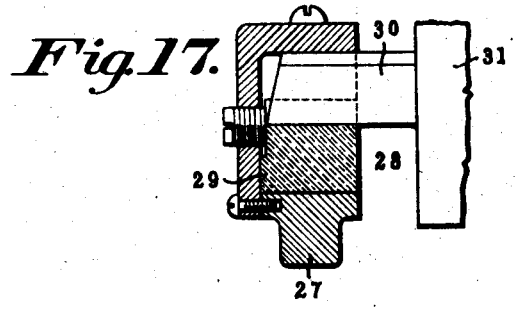
Figs. 16 and 17 are front and sectional side views, respectively, of the scale pivots.

Also supported upon the upper face of the mounting bed 25 are a pair of brackets 27, each having a pair of arms 28, which as in Fig. 17 support between them a piece of material constituting a bearing 29, upon which the bearing edge of a pivot member 30 rests, it being noted that this member is secured to and carries the scale beam 31 so that the latter is rockingly supported between the brackets 27.

As aforestated, the superstructure extends into that portion of the housing identified by the reference numeral 24 and within which the registering mechanism is in the present instance disposed. At a point approximately central of the housing portion aforementioned, this superstructure provides a pair of spaced arms 32, between which there is supported a shaft 33, carrying a pointer 34, which latter is adapted to traverse, and register with the graduations of, a dial 35 mounted within this housing portion.

The beam 31 may be connected with the platform 21 in any desirable manner, as for example by the use of a link or rod 36, and thus it will be appreciated that the movements of the platform 21 will be transmitted to the beam 31, in that the latter will be rocked around its point of pivotal support upon the platform being moved. If now the registering mechanism aforedescribed is connected with the beam, it will be obvious that the movements thereof will be registered; and further assuming that a proper counterpoise mechanism forms a part of the scale in order to properly counteract the beam movements, the registering mechanism in turn will indicate exactly the weight of the load disposed upon the weight-receiving portion of the scale, i. e., in the present instance, the platform 21.

Primarily with a view of providing a suitable mechanism for properly counteracting the beam movements, it will be perceived in the present instance that the beam 31 directly carries a pendulum weight 37, and also that a bracket 38 forming a part of the superstructure 26 provides suitable bearings for the support of a pendulum weight 39, which carries a bearing block 40, to which, as in Fig. 11, one end of a tape 41 is secured, the opposite end of this tape being suitably attached, as at 42, to the beam 31.

It will thus be understood, if the beam 31 is rocked in response to a load placed upon the platform, that the movements of this beam will be counteracted, first by the pendulum weight 37, and secondly by the weight 39. This counteracting being obviously of such a nature that an increasing resistance will be offered to the movement of the beam in responding to the load connected therewith.

As in Figs. 6 and 7, the shaft 33 which mounts the pointer 34 may carry a pinion 43 with which the teeth of an arcuate rack member 44 mesh, the latter being preferably carried by, and being adjustable relative to an arm 45. This arm may be rockingly supported by utilizing a pivot member 46 connected with its body, the edge of this pivot member resting upon bearing blocks 47 carried one by each of a pair of arms 48, which latter form a part of a bell crank presenting a downwardly extending arm 49. The bell crank is rockingly supported between a pair of lugs 50 fixedly secured to the superstructure 26 and to the rear of these lugs and preferably forming a part fixed relative thereto is a wall 51 through an opening of which a spring pressed bolt 52 extends, the inner end of the latter also extending through an opening in the arm 49 and acting against this element to normally tend to swing the same towards the wall 51, it being noted that in order to limit the amount of this swing a stop is provided by utilizing a screw-threaded pin 53, the screw-threads of which are adapted to engage with complementary screw-threads formed in a further opening in the wall 51, the inner end of this pin bearing against the outer face of the arm 49.

The lever, of which the arm 45 forms a part, extends beyond the point of pivotal support of this element and in the present instance terminates in a shoulder 54 formed with a groove within which the rib 55 of a block 56 is slidably mounted. At a point adjacent to the shoulder 54 which forms an extension, and in the present instance nearer to the point of pivotal support, there is provided an abutment 57 which forms part of the lever and extends between lips 58, forming a part of the block 56. Adjustably carried by engagement with the screw-threads of bores extending transversely of these lips are a pair of opposed set screws 59, the inner ends of which bear one against the opposite edges of the abutment 57. Thus it is obvious that although the block 56 is normally held immovable relative to the arm 45, this block is susceptible to adjustment relative to the elements carrying the same 57. It is here to be noted that the parts are properly held in assembled relationship and are capable of being locked relative to each other by preferably associating a set screw 57 with the block 56, and having the body of this screw extend through a slot in the shoulder 54, its head being in engagement with the outer face of this latter element. Attached to the upper edge of the block 56 and extending around part of the rear edge thereof (which latter is preferably rounded for this purpose) is a tape 60, the lower end of which is attached to the beam 31 and adjustable relative thereto, preferably by securing the same to what might be termed a carriage, which in the present instance, as in Figs. 8 and 9, includes a body 61. This carriage is slidably mounted upon the upper edge of the beam 31 by preferably having a slot 62 extending through its body, so that the latter may be attached to the beam 31 by utilizing headed bolts 63, the shanks of which extend through this slot and into threaded recesses formed in the beam 31, while the heads of these elements bear against the upper edges of the body 61. The tape 60 preferably bears against the outer or rear edge of the body 61 and with a view of assuring a proper cooperation of these elements the body at this point may be formed with a downwardly extending portion or shoulder 64, the tape being positioned along the outer face of this element and around the lower end thereof and being preferably fastened to a point along its inner edge. In order to adjust the lower end of the tape, i. e., in the present instance to shift the body of the carriage, it will be noted that the beam 31 may conveniently carry a lug 65 formed with a screw-threaded opening extending parallel to the longitudinal beam axis, and being adapted to be engaged by the shank 66 of a screw-threaded bolt, the head 67 of which, however, preferably lies within a groove 68 extending transversely of the body 61, which head is conveniently formed with openings for the reception of a pin or other suitable element, whereby, after the bolts 63 have been loosened, the carriage may be moved along the beam in order to adjust the same with that degree of nicety which is most conducive to the achievement of accurate results.

It will be apparent from the foregoing, that in addition to other functions which will be hereinafter described in detail, the registering mechanism is connected with the beam so that when the platform 21 receives a load, this will be evidenced, not alone by the movement of the beam and the corresponding movements of the pendulums, which are provided for the purpose of counteracting the beam movements, but also the amount of these movements will be evidenced by virtue of the fact that the registering mechanism will be actuated in order to cause the pointer to traverse the dial and finally to come to rest adjacent that graduation of the same which will indicate the weight of the article associated with the weight-receiving portion of the scale. It will also be noted that there has been illustrated a scale of that type which is known as an "increase capacity scale". In other words, if a load is placed upon the platform which exceeds the initial capacity of the scale, this will be evidenced by the pointer moving relative to the dial to a pointer beyond the graduation of highest value provided on the latter. Nevertheless, an operator may weigh such a load (providing of course that the same is less than the total capacity of the scale) by simply actuating the mechanism provided for this purpose, which serves in the present instance to double the scale capacity by associating a counterpoise with the beam the former acting to counteract certain of the movements of the latter and to supplement the aggregate counteracting tendency provided by the pendulum weights aforementioned.

Figures 12, 13:
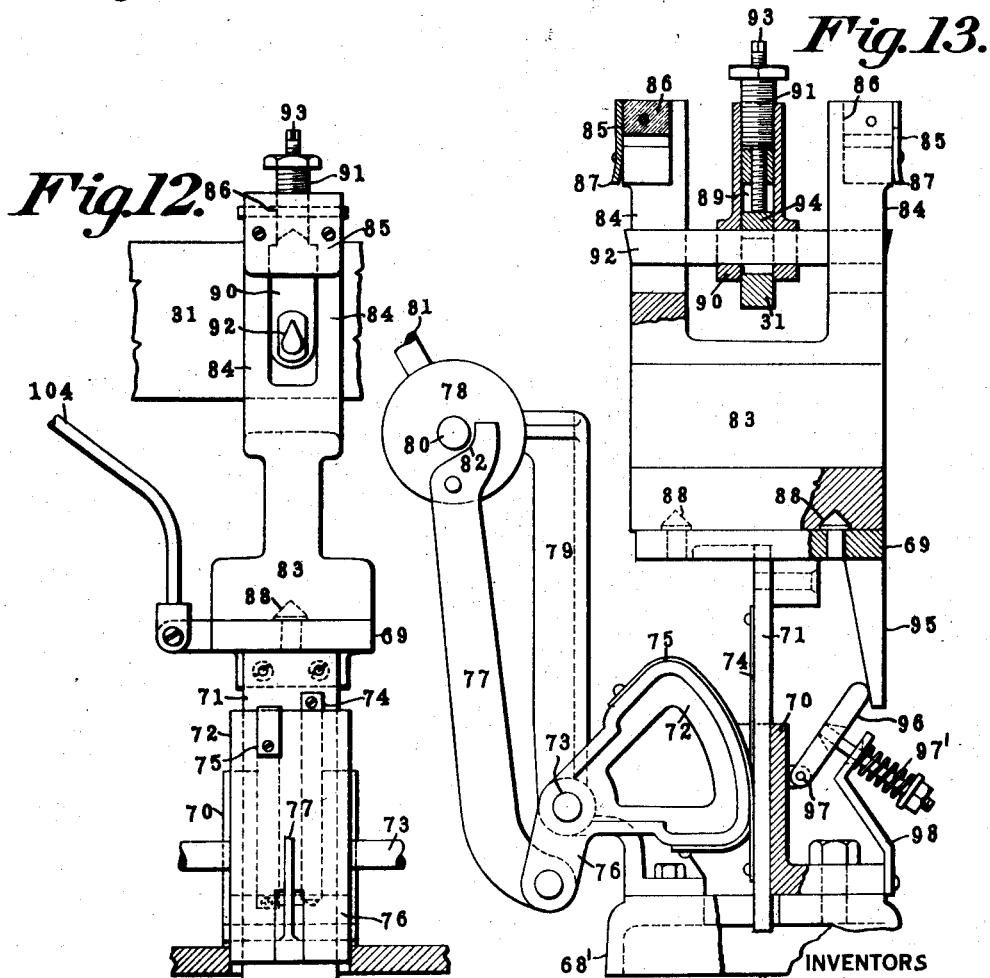
Fig. 12 is a fragmentary front view of a counterpoise and depositing mechanism therefor.
Fig. 13 is a partly sectional side view of this unit.
Figure 18:
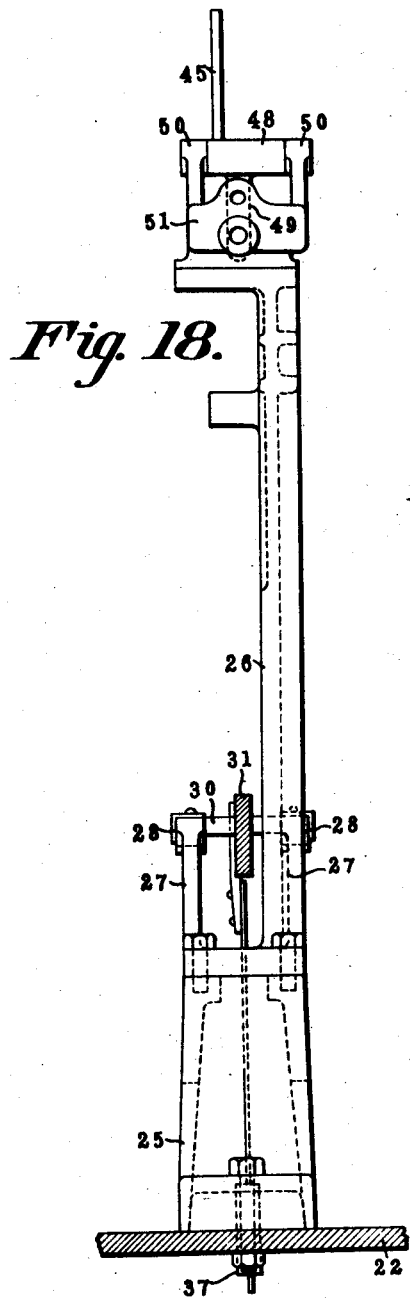
Fig. 18 is a side elevation of the scale mechanism supporting structure.
Figure 14:
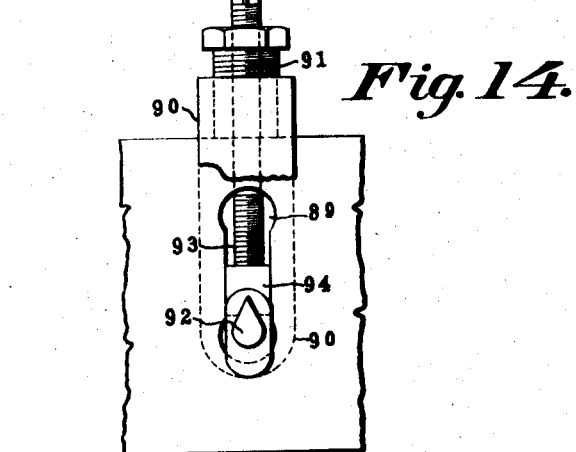
Fig. 14 shows in detail the adjusting member which may preferably be employed in connection with this latter mechanism.

One of the preferred forms of mechanism for achieving this result is in the present instance shown generally in Fig. 2, and specifically in Figs. 12, 13 and 14. This mechanism is preferably positioned adjacent one end of the beam 31 and may include a base 68, which is supported upon the bed 25. A platform 69 may be carried by the base by forming an opening in the latter and providing adjacent this opening guide-walls 70, which serve to confine the movements of a bar 71 to a given path, it being noted that the platform 69 is carried by and adjacent the upper end of this bar. Thus, it will be understood that if the bar is moved in a vertical plane, the platform 69 will be moved towards and away from the beam 31 which it underlies. With a view of effecting such a movement, a lever is utilized, which has one of its arms 72 provided with a curved edge lying adjacent to the bar 71, this lever being pivotally supported by the base 68', as has been indicated at 73. The lever may be connected with the bar in any desirable manner, as for example by using a pair of tapes 74 and 75 which have their inner ends attached one to each of the upper and lower edges of the arm 72, their bodies lying adjacent to the curved edge thereof, while their outer ends are attached to the lower and upper ends respectively of the bar 71.

It is thus obvious that if the lever is so rocked around its point of pivotal support 73 as to swing its arm 72 downwardly that the tape 74 will serve to positively lower the bar 71 so that the platform 69 is moved away from the beam 31. If, on the other hand, the arm 72 is rocked upwardly, the tape 75 will likewise in a positive manner raise the bar in order to elevate the platform and with a view of effecting these movements of the lever it will be noted that its second arm 76 extends beyond the pin 73 and terminates in a forked end portion between which the end of a link 77 is rockingly mounted, the opposite end of this link being secured to a disk 78. This disk may be carried by a bracket 79 which is attached to the base 68 and extends above and to one side of the same and carries at its upper end a shaft 80 upon which the disk 78 is mounted. The disk, in addition to supporting the upper end of the link 77, also carries a handle 81 and it is here to be noted that the upper end of the link is preferably offset as at 82 and extends to one side of the shaft 80 so that a stop is provided which limits the upward movement of the platform 69 as has been shown in Fig. 13, it being of course understood that the downward movement of this element will be limited incident to certain portions of the weight depositing mechanism coming into contact with each other, or by the fact that the link 77, upon being moved upwardly to a certain point, will have its outer edge come into contact with the shaft 80.

Carried by the platform 69 is a counterpoise weight 83, which in the present instance has its upper face provided with crossed grooves so that four arms 84 are provided, one preferably adjacent each corner of the weight body. Extending between pairs of these arms and parallel to the beam 31 are two plates 85 adjacent to each of which a bearing element 86 is supported, it being noted that for a purpose hereinafter described the bodies of the plates adjacent their lower edges are bent to extend outwardly, as indicated at 87. Furthermore, it will be observed that means are provided for assuring the centering of the weight upon the platform, this function in the present instance being accomplished by the use of trim having conical heads 88 extending above the platform and adapted to project into correspondingly shaped recesses formed in the lower face of the weight.

Due to the grooves provided in its upper face, the weight accommodates the beam 31 and the latter at this point carries a fulcrum pivot pin 92 from which the weight 83 may be suspended. This suspension may be effected by forming the beam with an opening 89, which extends through its body and between the upper and lower edges of the same. Carried by the beam at a point adjacent this opening is a U-shaped supporting member 90, the arms of which straddle the upper beam edge and extend one adjacent each of its side faces. The upper end of this member is formed with the screw-threaded bore within which a corresponding plug 91 is mounted, it being here noted that the latter is formed with an axially extending opening through which a pin 93 projects so that when the member 90 is in a locked position upon the beam, the lower edge of the plug 91 bears against the upper edge of the beam, while the pin 93 extends through this plug and through an opening in the beam which opening is intersected by the opening 89 so that this pin bears against a block 94 which is interposed between the end of the latter element and the upper edge of the pivot member 92, it being understood that this element is carried by passing the same through openings extending transversely of and formed in the lower ends of the arms of the member 90. As a consequence it will be appreciated that if the position of the pivot member 92 is to be shifted vertically to occupy a higher horizontal plane, this may be accomplished simply by initially turning the pin 93, in the present instance, in an anti-clockwise direction and in subsequently rotating the plug 91 in a clockwise direction. The first of these movements will bring the lower end of the pin out of engagement with the bearing block 94, while the last of the same will serve to bodily raise the member 90, and as a consequence elevate the pivot member 92 to the desired plane at which point the bearing block 94 may again be engaged by the lower end of the pin 93 to thus lock the parts. If on the other hand the pivot is to be shifted to occupy a lower horizontal plane the desired result may be achieved simply by rotating the plug 91 in an anti-clockwise direction and subsequently turning the pin 93 in a clockwise direction in order to shift and lock the parts.

Due to the fact that the fulcrum member is of a length substantially equal to the space extant between the inner and opposed faces of the plates 85, the function of the outwardly extending lower edge portions of the same will become apparent in that these parts will serve as guides upon the weight 83 being deposited upon the element 92, it being apparent in this connection that if there should exist some misalignment of the parts the guiding and centering portions, provided by having the lower edges of the plates bent, will effectually serve to properly correlate these elements.

Referring to the specific operation of the weight deviating mechanism, it will be understood that with the parts disposed in the position illustrated in Fig. 13, a depression of the handle 81 will result in a rotation of the disk 78 and a consequent draft being exerted upon the link 77, which will cause the lever arm 76 to be rocked upwardly, thus moving the opposite arm 72 of this member in a downward direction. This latter movement, incident to the provision of the tapes, 75 and 74, will serve to allow of and positively lower the bar 71 to thus correspondingly move the platform 69 together with the weight 83, and if this downward movement is continued to a sufficient extent, it will be appreciated that the bearing portions 86 carried by the plates 85 will be engaged by the upper, i. e., fulcrum edge of the element 92, and a continued downward movement of the platform will eventually result in a space being provided between the upper face of the same and the lower face of the weight, which space will be adequate to permit of the movements of the latter without interference. In this connection, it is also of interest to note that when the platform 69 is in elevated position, and as a consequence the weight 83 is removed from the element 92, the beam 31 will not have its movements interfered with due to the fact that these movements are sufficiently limited and the length of the arms 84 is sufficiently great to permit the beam to freely rock in response to a load being associated with the scale, it being understood that during such rocking, unless the platform 69 is deliberately moved, the element 92 will not engage either the upper face of the weight 83, at points between these arms, nor the bearing elements 86 carried at the upper ends of the same.

Due to the provision of the mechanism which permits of the fulcrum member being adjusted to occupy different horizontal planes, it will be understood that the action of the scale may be quickened or slowed down, as may be desired, this effect being predicated to the fact that as the weight 83 has its point of suspension in a plane higher than that of the main beam pivot, the scale action will be materially speeded up, while if the reverse is true, the response of the scale mechanism will be increasingly sluggish, according to the amount of adjustment given.

In certain instances it has been found, due to the careless operation of the scale, that there exists some possibility of the counterpoise weight and depositing mechanism therefor being injured incident to an operator violently striking the handle 81 in order to quickly lower the platform 69. In order to overcome any difficulties in this connection, it has in certain instances been found desirable to utilize a shock-absorbing mechanism which may embrace wedging fingers 95 carried by and depending from the platform 69, together with a friction plate 96 adapted to cooperate therewith, which friction plate as at 97 may be rockingly carried by one of the walls 70 and be normally held to have its rounded outer edge portion bear against the inner face of the fingers 95 by any suitable means, such for example, a spring-pressed bolt 97' which is carried by a bracket 98 supported by the base 68, while the opposite end of this bolt is attached to the plate 96. It will be apparent that where a construction such as this is utilized, an increasing resistance will be offered to the depressing of the platform 69. While this resistance will not be sufficient to cause any difficulty in operating the mechanisms, it nevertheless will be ample to prevent the parts being damaged incident to the bearing portions 86 violently coming into contact with, or in other words being dropped upon, the fulcrum element 92, and thus the desired result will be achieved.

It will be understood that when the depositing mechanism is actuated in order to associate the counterpoise provided by the weight 83 with the beam 31, the movements of the beam will be counteracted, or in other words the capacity of the scale will be increased, and according to the present embodiment of the invention, this increase in capacity will be equal to the initial capacity of the scale provided by the pendulum weights 37 and 39, or other mechanism which counteracts the beam movement.

While the position of the handle 81 will serve to indicate whether the weight 83 is supported by the beam 31 or not, it is in most instances desirable to have a further indication of the position of the parts, and with this in mind a registering mechanism is provided which supplements the registering mechanism afforded by the dial 35 and pointer 34. This supplemental mechanism may include a lever 99 which has one of its ends pivotally supported by a shaft 100, its opposite end carrying a plate 101 bearing indicia indicative of the value of the counterpoise provided by the weight 83. As in Fig. 1, the dial 35 may be provided with a window 102, and the plate 101 is positioned to the rear of this window so that upon the former being moved to proper position, the indicia carried thereby will be displayed within the latter. For the purpose of effecting this movement of the parts, the lever 99 is formed with a slot 103, within which lies a pin carried by the upper end of a connecting member, the lower end of this member being preferably attached to the platform 69, as has been most clearly shown in Fig. 12. It is thus obvious that with the platform raised in order to remove the weight 83 from association with the beam 31, the connecting member 104 will have its body also moved upwardly, which will result in the lever 99 having its outer end elevated to an extent sufficient to bring the blank portion of the plate 101 into registry with the window 102 to indicate that the weight is not in association with the beam. However, if the platform is depressed to suspend the weight on the beam, the connecting member 104 will be correspondingly depressed to move the lever 99 and to bring the indicia displayed by the plate 101 into the frame provided by the window 102, so that the disposition of the weight upon the beam will be clearly apparent to an operator. It is to be understood that numerous forms of registering mechanism might be provided in order to indicate this result, but for the sake of brevity and for indicating one practical manner of accomplishing this effect, the present mechanism has been illustrated.

Again referring to Fig. 2, it will be noted that a dashpot is positioned adjacent that end of the beam 31 opposite to the end with which the weight depositing mechanism is associated. This dashpot includes an exterior hollow casing 105 and a lid portion 106, as well as a base 107. These elements are preferably held in assembled relation by means of bolts 108, which extend through openings in the lid 106 and through the casing into screw-threaded recesses formed in the base. Extending upwardly from the base is a preferably annular wall 109 providing a cylinder with respect to which the walls of the shell 105 may be concentrically disposed, and at a point above and spaced from the upper edge of the cylinder 109 is a skirt 110 which is attached to and extends downwardly from the lid 106, it being here noted that the diameter of the cylinder provided by the wall 110 is preferably less than the diameter of the skirt, and furthermore it will be observed that the lower edge of the element is beveled upwardly as at 111 for a purpose hereinafter brought out. Extending within and movable relative to the shell of the dashpot is a plunger 112, the upper end of which projects through an opening in the lid, which opening is preferably of a materially greater cross-section than that of the plunger 112, so that this element may be freely moved within the casing from a point exterior of the same. Formed in the upper face of the dashpot lid and surrounding the opening last mentioned is an annular rib 113, and carried by the rod 112 at a point above this rib is a cover 114 having a skirt 115, the cover being of a diameter larger than the rib, while the skirt is of a diameter less than the same. Also carried by the plunger and normally occupying a position between the opposed edges of the wall 109 and skirt 110 is a deflector, which in the present instance includes a conically shaped shield 116, and further carried by the said plunger at a point well within the cylinder 109 is a piston 117, the edges of which are preferably materially spaced from the inner face of the cylinder wall. Thus, due to the fact that the upper end of the rod or plunger 112 is attached to the beam 31, it will be apparent that as the latter is rocked around its point of pivotal support the piston 117 will be reciprocated within the cylinder, and in the event that the cylinder is filled with a suitable cushioning fluid, as for example oil, it will be apparent that the action of the scale will be steadied or dampened.

In order to properly guide the movements of the rod 112 within the shell 105, the former may have its lower end provided with a bore, into which a pin 118 carried by the base 107 may extend, these elements cooperating together in order to guide the movements of the piston 117 within the cylinder, and consequently to confine the rod and those elements carried thereby to proper paths. When it becomes necessary to fill the shell with additional fluid, this may readily be accomplished as in Fig. 2 in that a filling spout 119 is provided which has its lower end, communicating with the interior of the shell 105 at a point adjacent the lower edge of the latter, the fluid introduced therethrough being primarily disposed in the space extant between the inner faces of the shell and the exterior face of the cylinder wall 109. It is here to be noted that the upper end of this spout may terminate in substantially the same plane as that occupied by the upper surface of the cushioning fluid when the latter is at maximum level and this end of the spout may normally be closed by a suitable cap. A passage 120 is formed adjacent the base of the wall 109 and affords communication between the interior of the cylinder and the space into which the cushioning fluid is initially introduced. If desired, the flow of fluid through this passageway may be regulated by utilizing a valve which has its stem passing through an opening in the lid and is provided at this point with screw-threads engaged by a nut 121, by means of which the same may be raised or lowered as desired, the lower end of this stem constituting the valve body proper. This lower end, as will be seen in Fig. 19, extends into the passage 120 and is extensible into a valve receiving recess 123 formed in the base thereof, so that the fluid flow through the passage may be regulated to be as minute or great as may be desired, and in fact may be entirely cut off if the stem 122 is projected to its greatest extent.

While the connection between the plunger 112 and the beam 31 may be established in various manners, it is preferred that these elements be connected by utilizing a U-shaped member 124, the arms of which extend upwardly and adjacent to the side faces of the beam, while the base of this member is rockingly attached to the upper end of the rod 112, preferably by means of a pin 125 extending transversely through both of these elements. In order to secure the member 124 to the beam 31, a further pin is employed which may conveniently extend through and transversely of the beam body and the arms of the member, this pin being identified by the numeral 126, and in order to prevent an accidental displacement of these elements two springs 127 are conveniently attached one to each of the outer faces of the arms of the U-shaped member and bear against the rounded ends of the pin 126. By this construction it will be apparent that a universal joint has been provided which, while transmitting the beam movements to the plunger of the dashpot, will nevertheless prevent any binding of the parts of these mechanisms.

It will thus be seen, that as aforestated the movements of the beam 31 will be effectually dampened in order to prevent any injury to the scale mechanism and the particular advantages derived by the use of a dashpot constructed along the lines just suggested will hereinafter be more fully brought out.

In certain instances, a scale of the type aforementioned is called upon to weigh a net load. In other words, assuming that the loads of a number of receptacles are to be weighed by disposing such articles one after another upon the weight-receiving portion of the scale, it will not be desired to have to deduct the known value of the receptacle, as for example a wheel-barrow, truck, etc., from the amount of the weight registered. With this in mind in the present instance, a tare system or mechanism has been incorporated in the scale structure.

One form of this mechanism has been best shown in Figs. 2 and 3. In these views it will be noted that a track 128 is attached to the beam 31 and disposed in parallel and spaced relation to the latter by any suitable means, such as for example by utilizing bolts 129 which have one of their ends attached to the track 128, their opposite ends being fixedly secured to the beam 31. Fixedly attached to the track 128 is a bracket 130, the outer end of which supports a shaft 131 carrying a knurled knob 132, while the inner end of this element preferably extends above the beam and track and carries a pointer 133 disposed approximately intermediate the ends of the beam. Attached to the shaft 131 is a pinion 134, the teeth of which mesh with the teeth of a rack 135, which latter is supported by a slide 136 having its upper surface 137 preferably inclined towards the forward face of the scale housing, its body also including track embracing portions 138 so that it may freely be moved longitudinally of the beam. The upper face of the slide body presents a scale in that this upper face is preferably marked off into minute graduations (not shown) and directly above this upper face the enlarged part 23 of the scale housing has an offset portion 139 preferably extending above the upper face of the slide. This offset portion is formed with an opening within which a lens housing 140 is disposed, the housing carrying a magnifying lens 141 so that the indicia on the upper face of the slide 136 may be read with facility, it being understood that the lens is disposed so as to be in alignment with the pointer 133, which will thus furnish a reading or sight point for the graduations.

In operating the construction involved in the tare system, it will be understood that with the weight of the receptacle known, the knob 132 may be turned in order to rotate the shaft 131 and correspondingly move the pinion 134 in order to project the slide 136 along the body of the track 128, and this projection may be continued until that graduation appearing upon the upper face of the slide and which corresponds to the known weight value of the load underlies and is in proper registry with the pointer 133, which fact will be indicated by an operator glancing through the lens housing 139. The scale is now ready for operation, and it will be obvious that the receptacle or other weight value will be automatically deducted from the gross weight, and the main registering mechanism associated with the scale will accordingly only indicate the net amount of the load supported by the weight-receiving portion of the scale. Obviously, if the weight of the receptacle or factor to be allowed for is unknown, this may readily be determined by simply positioning the article upon the platform 21 and projecting the slide 136 until the pointer 34 registers with the zero graduation of the dial 35. By now suitably maintaining the slide in this position, it will be obvious that the net weight of succeeding loads may be accurately and readily determined.

In certain instances, where a scale of this type is employed, for example in a freight yard, a source of illumination should be provided in order to expedite the reading of the registering mechanism. Also irrespective of the location of the scale, it is in most instances desirable to provide a lock for the mechanism. Such a lock in the present instance is furnished, as for example in Figs. 2 and 4, by utilizing a shaft 142 which may incidentally provide the point of pivotal support 100. This shaft has its outer end, which extends beyond the scale housing, carrying a handle 143, its inner end carrying a crank arm 144 to which one end of a link 145 is attached, the opposite end of this link terminating adjacent one of the outer ends of the beam 31 and being there attached by means of a further arm 146 to a shaft 147. The beam 31 has that end of its body which is disposed adjacent to the shaft 147 provided with an extension or reduced portion 148, and as will be noted the shaft 147 is mounted upon a bracket 149, which is carried by the bed block 25 and terminates in a frame 150 within which the reduced portion 148 of the beam is freely movable; it being observed that the shaft 147 is disposed adjacent to the lower end of this frame. Extending through and below the upper frame element is an adjustable stop member in the nature of a set screw 151 with the inner end of which the upper surface of the reduced end portion aforementioned is adapted to contact, when this end of the beam is in its uppermost position. In order to lock the parts by forcing the beam to such a position and preventing any further movement of the same relative to other parts of the mechanism, it will be observed that the shaft 147 carries a tongue 152, the outer end of which is preferably rounded, so that it will be apparent that by swinging the handle 143 the shaft 142 is rotated to rock the arm 144 and correspondingly move the link 145, which will transmit this movement to the shaft 147 and consequently the tongue 152 carried thereby, thus optionally moving the tongue to a position at which it will press the reduced portion of the beam into intimate contact with the stop 151, or in which it will not in any wise interfere with the movements of the beam.

Now with a view of providing a source of illumination as previously referred to, and further having in mind that it would be wasteful to have this source active when the scale parts are in locked position, it will be observed that as in Fig. 2 a switch 153 of the "push-arm-type" may be employed, the arm 154 of the same being engageable and movable by either one of a pair of operating members 155 associated with the link 145. Thus, when the handle 143 is moved to unlock the mechanism, the arm 154 of the switch will be engaged in the present instance by the right-hand operating member 155 in order to close the circuit and cause the source of illumination 156 to direct light rays against the face of the registering mechanism; while if the handle 143 is moved to throw the parts into locked position, the left-hand operating member 155 will engage with the switch-arm as in Fig. 2 in order to interrupt the circuit and cause a cessation of operation on the part of the illuminating element.

The proper operation of scales of this type is often interfered with due to the entrance of dust and other foreign matter into the operating mechanism thereof, this objection being particularly apparent where a number of joints are provided, as well as a number of movable controls for the mechanism extending through the scale housing. This latter condition is prevalent in the present instance, in that it is apparent that the handle 81 will extend beyond the scale housing, the same being also true of the rod 53, knob 132, handle 143 and handle 81. Also, while most of the joints between elements immovable with respect to each other may be tightly closed, difficulty has usually been found in providing a proper closure between the glass covering the dial and this dial.

Considering primarily the joints between elements movable relative to each other, it will be observed as in Fig. 2 that, that portion of the housing 24 through which the rod 53 extends, provides what might be termed a bearing 156, and as in Fig. 10 the outer face of this portion may carry stop pins 157 with which a pin 158 carried by the rod 53 may cooperate. It is obvious that the movements of the rod are thus confined incident to the provision of the stop pins, which in addition to serving the purpose hereinbefore mentioned, also prevent the rod moving freely through the bearing portion 156' of the housing to thus carry particles of foreign matter into the interior of the scale. The shaft 131, on the other hand, extends through an opening in the housing portion 23, which opening is preferably formed in the base of a dished portion 159 so as to house to as great an extent as possible the shaft 131, it being understood that the size of the opening in the base of the dished portion is preferably just sufficient to allow free turning of the shaft without the parts binding. Parallelly the construction employed in connection with the rod 53, the shaft 142 carrying the handle 143 extends through a relatively long bearing portion 160, forming a part of the scale housing, and thus at this point the entrance of moisture and foreign matter will also be reduced to a minimum. Finally, referring to the member which controls the action of the weight depositing mechanism, i. e., the handle 81, it will be observed that this handle may normally extend within a recess provided by a rearwardly bent plate 161, which has its edges tightly secured to the housing portion 23 and is formed with an opening of just sufficient size to accommodate the disk 78, to thus achieve the result desired.

As aforestated, the joints between the scale housing portions are preferably made as dust and fluid-proof as possible, and reference being had to Fig. 5, it will be perceived that, in order to provide a tight joint between the glass which covers the dial and the scale housing 24, a construction has been employed which may conveniently include the thought of beveling the glass plate 162 which covers the dial and in forming the housing 24 with an inwardly extending portion 163 projecting at an angle corresponding to that at which the edges of the glass are beveled. Thus it will be obvious that a tight seat will be formed between these elements, and with a view of maintaining the position of the parts it will here be observed that a clamping ring 164 may be utilized which will force these parts into intimate contact.

Figure 16:
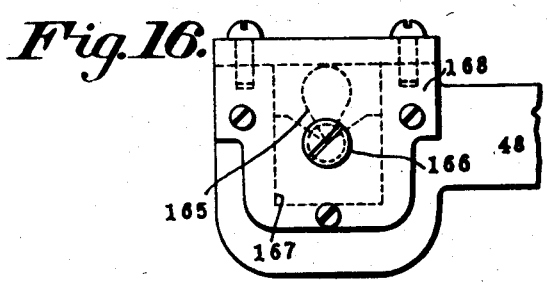

Similarly to the manner in which the beam 31 is mounted, the pendulum 39 may also be suspended in that, as in Fig. 16 the pivot member 165 which supports the pendulum weight 39 may rest upon a bearing member 167 corresponding to the bearing member 29, and these parts are maintained in proper position by the use of a plate 168 which is primarily attached to the bracket 38, and in turn may carry a set screw 166, which extends through a screw-threaded opening in this plate and engages the bearing member 167 in order to lock this element in position.

It has also been found that in employing a construction within the scope of the present invention that the pinion which is carried by the shaft 33 may be of an unusually large size, it being understood that, this being permissible, the degree of accuracy of operation of the parts will be materially enhanced. In order to maintain a proper engagement of the pinion and rack teeth, without causing any binding of the parts, the shaft 33 may carry a drum 170, about which a flexible suspending member 171 is coiled, the opposite end of this member supporting a weight 172, this construction guarding against any backlash on the part of the engaging teeth of the pinion and rack. Furthermore, to assure positive movement, the arm 45 which carries the rack member 44 preferably presents a curved bearing surface 173, against which a tape 174 may lie, the lower end of this tape supporting a weight 175, which tends to swing the arm 45 downwardly and consequently exert a tension upon the tape 60.

Assuming, for example, that a scale such as that illustrated is constructed, it will primarily be appreciated, due to the fact that virtually the entire scale mechanism is supported as one unit, that the liability of error is reduced to a minimum, and furthermore that the necessity of frequent adjustments of the parts is overcome. In other words, by means of the present invention, all of the vital parts are supported as one unit, and independently of the upper housing portion, it being thus obvious that those inaccuracies which are chargeable against conventional constructions are avoided.

Specifically reviewing one of the causes to which these improved results may be attributed, it will be noted that while, according to the present exemplification, the bed block 25 may be carried by the base portion 22 of the housing, it is nevertheless apparent that virtually all of the weighing mechanism forms a unit for which the block 25 acts as a support, it being noted in this connection that the beam by means of the brackets is directly carried by the block, while the dash pot and weight depositing and removing mechanisms are also directly supported thereby. Furthermore, the super-structure provided by the element 26 and the various brackets and arms associated therewith and fixed with respect thereto, is also fixedly mounted upon the block. The only exceptions in this connection are to be noted in that the screw threaded rod 53 extends through an opening in the portion 24 of the housing, while the handles 143 and 81 as well as the shaft 131 also project beyond the casing of the scale.

Referring to the first of these elements, i. e., the rod 53, it is obvious, however, that due to the fact that only the smooth portion of this member in the present instance, is in contact with the housing, that the latter may be subjected to strains without any movement incident to the strains being transmitted to the scale mechanism. Also referring to the other members which extend through openings in the casing, it will be apparent that these elements are of such a character that even if some strain should be placed upon them a faulty registration would not result.

It will be appreciated, if the parts are set up properly in the manner here illustrated, and after these parts are assembled, the mechanisms may be adjusted in the following manner:

The beam 31 will be mounted to be properly supported upon the bearing members 29, which latter have been secured in place by a clamping element similar to the screw 166. After the balance of the beam has been properly established, the pendulum weight 39, is connected therewith, by means of the tape 41, it being understood that before this connection is resorted to, the pendulum weight has, in turn, been properly balanced upon the bracket arms 38, and the adjustable stop provided by the bolt 176, (Fig. 2) may be positioned in order to limit the movements of the weight in one direction. It will be understood that previous to this connecting of the parts, the lock, which is actuated by the handle 143, may be thrown so that the beam is held in its neutral or zero position, and in order to prevent this member from moving beyond this position the stop provided by the set screw 151 may be adjusted in such a manner that the end of the same bears against the upper edge of the beam, while the lower edge of the portion 148 of this member is contacted by the rounded end portion of the tongue 152.

The ends of the tape 60 having been connected with the carriage and block respectively, as, for example, in the manner indicated in Fig. 11, this carriage may be attached to the beam, while the block may be properly associated with the lever arm 54, and in order to neutralize the upward lift of the beam, which would occur incident to the pull exerted by the tape 60, a counterpoise 177 of the proper value may, if necessary, be suspended from the beam end, it being understood that with the parts in these properly adjusted positions, the mechanisms hereinbefore described, will accurately counterbalance each other.

Referring to Figs. 6 to 9, it will be assumed that the tester desires primarily to adjust the registering mechanism to indicate zero when the parts are in their normal positions. The pointer 34 may at this time indicate either minus or plus zero, and it will be understood that due to the provision of the tensioning means, the arm 45 will tend to swing downwardly, so that the tape 60 will be under tension. If, now, one of the set screws 59 is loosened and the other one is tightened or projected, it will be obvious that the block 56 will move relative to the arm 54 and for the reason that the tape 60 remains stationary the arm 45 will move, and as a consequence the tester will be able to bring the pointer into alignment with the zero graduation of the dial. Assuming now upon a test being made that the registering mechanism, for example, indicates that a test load of 500 lbs. weighs 510 lbs. the next step in the proper coordination of the elements may be taken. This step in the present instance includes the shifting of the lower end of the tape 60 towards or away from the point of pivotal support of the beam 31. This adjustment is effected by simply loosening the bolts 63 and by turning the head 67 in order to rotate the screw threaded shank 66 relative to the block 65 to move the carriage in the manner desired to accordingly shift the lower end of the tape 60. In such shifting, it will be obvious, assuming that the movements of the beam 31 remain constant, that the length of the path traveled by the tape 60 will be minutely varied, aside from the fact that the speed with which this tape moves, will also be varied, it being furthermore understood that the force of the movement will be altered according to the amount of shifting of the carriage. In the present instance, due to the fact that the inspector or adjuster is confronted with the problem of the scale registering in excess of the actual load placed upon the weight receiving portion of the scale, he will shift the carriage towards the point of pivotal connection of the beam 31 to correspondingly move the lower end of the tape 60. By this adjustment the amount of travel of the tape will be reduced, and it will be understood that the adjustment may be so carefully made that the pointer 34 will finally stand in alignment with the 500 lb. graduation of the dial 35.

It often occurs that the error in reading is such as to require more than one adjustment on part of the block 56, as well as the carriage carrying the lower end of the tape, but it will be understood, finally that these elements may be so coordinated that when the scale mechanisms are in neutral position the registering mechanism will stand at zero, while the weight value of a test load subsequently placed upon the platform 21, will in each instance be accurately indicated by the registering mechanism. Due to the adjustments thus provided, it will be obvious that the range of the scale may be accurately regulated and it becomes unnecessary to shift the various levers and points of pivotal support (as for example the beam and pendulum 39) which is a much desired result in that although it has been heretofore possible to correct errors by adjusting these elements, it has usually been found that this is but a makeshift provision, resulting in the setting up of a new train of errors which have to be compensated for. It has, furthermore, been found that by using a construction within the scope of the present invention, such as, for example, that specifically illustrated, that when adjustments are once made and the movement of parts properly coordinated, the scale may usually be employed over a relatively great length of time without it being necessary to unseal the housing for the purpose of making subsequent adjustments to compensate for wear, temperature changes and other factors which have to be contended with in order to maintain the accuracy of the registered result. Any adjustment which does become necessary may be made by an unskilled operator simply by turning the projecting end of the rod 53 in order thereby to rock the bell crank lever 49, and to accordingly shift the plane of pivotal support of the lever carrying the rack 44, which shifting, although of a minute character, and definitely limited by the provision of the stops provided by the pins 157 and 158, is sufficient to afford an adjustment over a greater range than has heretofore been regarded as feasible.

While referring to the registering mechanism, it is of interest to note that due to the relatively great amount of movement of the rack 44, it is practicable to utilize a pinion of a size larger than has heretofore been customary. As a consequence, the accuracy of the registered result may be relied upon to a much greater extent than in ordinary commercial scales. Also, in this connection, it will be understood that this desirable feature is to a certain extent predicated upon the fact that there has been incorporated in the scale mechanism a means which will serve to cause the teeth of the pinion and rack to mesh in an extremely positive manner. In other words, due to the utilization of the weight 172 a positive contact between the teeth of the pinion and rack is at all times assured and a back lash of one of these elements relative to the other is prevented, it being furthermore noted that the inspector or adjuster is able, due to the fact that the rack is adjustable relative to the arm 45, to move the same to a position at which the teeth of the rack and pinion will inter-engage to the greatest possible depth without actually binding.

With reference to the dash pot, it will be understood that by utilizing a mechanism of this nature the parts are quickly brought to rest, aside from the fact that if a load is suddenly deposited upon or removed from association with the mechanism, the parts thereof will not be damaged in that this element will act as a cushioning member. More particularly this effect is to be predicated to the cylinder and piston construction provided, and the use of a cushioning fluid, it being understood that due to the cooperation of the parts this cushioning effect will be exerted to a maximum extent, although incident to the anti-frictional spacing of the movable elements, the construction of this mechanism prevents any danger of binding. Further, it will be understood that by using the pin 118 the parts are always maintained in properly centered position, while the amount of cushioning effect may be varied, with that degree of nicety most conducive to the achievement of the best results, incident to the provision of the valve 122, which will permit of the regulation of the flow of fluid through the passage 120, it being understood in this connection that this passage also serves to permit the re-entrance of the fluid into the cylinder in order to maintain a proper level.

It will be noted that in order to prevent the casing 105 from being filled to too high a level the filler spout 119 terminates in a plane substantially equal to that occupied by the upper surface of the fluid when the latter is at a maximum level within the casing, and thus it will become virtually impossible to fill the dash pot to an excessive extent. It has also been found due to the construction provided that even although the parts should be subjected to violent and rapid movements, that the fluid within the dash pot will not be splashed out of the same, this result being predicated to the construction and relative disposition of the parts, which will always serve to counteract this tendency, and in the event of the fluid being splashed to a certain extent, the construction of the device will be such as to serve to return the escaped fluid to the interior of the casing.

The mechanisms of the scale are set and properly adjusted, usually, before leaving the factory. In other words, the movements of the tape 60 are properly restricted and defined by the adjusting members to which the ends of the same are attached. Also, before these adjustments are made, it is apparent that the mechanism is set up in such a manner that the beam is in correct balance, the same being also true of the weights 37, 39 and 175 relative to each other and to the beam. Conveniently at this time the pivot member 92 may also be adjusted in such a manner that the scale mechanism will respond without such response being sluggish or too fast.

Assuming, for example that an operator now wishes to determine the weight value of the net contents of a number of receptacles, the gross weight of which will be, for example, 1440 lbs., the net weight of the receptacle being 220 lbs.: It will be appreciated that he will unlock the mechanism, and thus energize the illuminating element 156. An empty receptacle will primarily be placed upon the platform of the scale to determine the net weight thereof. The tare beam or slide 136 may now be moved longitudinally of the beam 31 until that graduation having a value equal to the registered weight of the receptacle 137, is in registry with the pointer 133, in which position it will be found that the tare beam provides a counterpoise of a value equal to the weight of the unfilled receptacle, and consequently the registering mechanism provided by the pointer 34 and dial 35 will indicate a zero or neutral position of the parts. A filled receptacle may now be placed upon the platform, and it will be obvious that the pointer 34 will traverse the dial 35 incident to the movements of the weighing mechanism, and this pointer, will, in the present instance, come to rest at a position beyond the graduation of highest value presented by the dial, so that it will be apparent to the operator that the initial capacity of the scale had been exceeded. By moving the handle 81 the platform 69 will now be lowered and in such lowering, the weight 83 will be properly suspended from the beam 31 by means of the pivot member 92. Thus, the capacity of the scale will be doubled and as a consequence the pointer 34 will traverse the dial 35 in an anti-clockwise direction and come to rest in a position at which the indicated result will be 220 lbs. Due to the fact that upon the platform 69 being lowered, the lever 99 is moved against the tension of the spring 178 in such a manner that the indicia (in the present instance the indication 1000) will be visible through the window 102, and the operator will immediately know that the weight of the net contents of the receptacle is 1220 lbs.

It will be, of course, understood that if the gross weight of an article is to be determined, it will not be necessary to utilize the poise provided by the tare beam, and obviously, if the weight of the article does not exceed the initial capacity of the scale, it will be unnecessary to actuate the weight depositing mechanism, and the platform 69 may accordingly be maintained in a position at which the weight carried thereby will not be associated with the beam. It is of interest to note that in certain instances where an unusually heavy article is to be weighed, the weight value of which is in excess of the capacity of the scale, even as provided by the primary and secondary weighing mechanism of the same, that the tare beam may be utilized to supplement the capacity of the scale so that the weight of the article may accordingly be determined. It will be observed that the tare beam in itself provides a poise of variable value, and this value covers a considerable range in that by virtue of the fact that the slide is mounted upon the track 128 and the manner of such mounting this element has a considerable path of travel and a consequent great range. Also, due to this peculiarity of mounting, there will be no play between the parts, and as a consequence, it is practicable to have a minutely subdivided scale upon the upper face 137, of the slide 136, the graduations of this scale being enlarged so as to be readily visible and readable by the operator. This person in order to glance through the lens mounting 140, has to assume a position adjacent to the same, and in line with the pointer 133, and thus his line of vision or sight might be termed as being neutral, and consequently the accuracy of the results may be relied upon, it being understood that rays of light from the illuminating element 156 will be reflected upon the scale of the slide 136.

Finally, the dash pot under all circumstances, will act, as aforebrought out, to absorb most shocks to which the mechanism may be subjected to prevent damage occurring thereto, while even although the weight depositing mechanism may be actuated by an inexperienced operator, it will be apparent that incident to the provision of the shock absorbing feature, damage will be prevented from occurring. Also for the reason that the scale will be as nearly dust-proof as possible, it will be appreciated that the scale will have a maximum life, and the elements will be prevented from effecting an entrance into the mechanism.

From the foregoing, it will be understood that the objects of this invention have been accomplished, and since certain changes may be made in the above construction and different embodiments of the invention could be made without departing from the scope thereof, it is intended that all matter contained in the above description or shown in the accompanying drawing shall be interpreted as illustrative and not in a limiting sense.

Having described our invention, what we claim as new and desire to secure by Letters Patent, is:

1. A scale including in combination a housing formed with an opening, a weighing mechanism within said housing, means adapted to be associated with said weighing mechanism to increase the capacity thereof, controlling means for said last named means and extending through the housing opening, and means forming part of said scale for preventing the entrance of foreign matter through said opening.

2. A scale including in combination a housing formed with an opening, weighing and registering mechanisms within said housing, means for adjusting said registering mechanism, movable controlling means for said last named mechanism and extending through said housing opening and a bearing associated with said housing and enclosing said controlling means to prevent the entrance of foreign matter into the scale housing.

3. A scale including in combination, a housing formed with an opening, a weighing mechanism with said housing, means adapted to be associated with said weighing mechanism for increasing the capacity thereof, controlling means for said last named means and extending through the housing opening, and means forming a part of said controlling means for preventing the entrance of foreign matter through said opening under different positions of said controlling member.

4. A scale including in combination, a housing formed with a recessed portion and having an opening in said portion, a weighing mechanism, within said housing, means for increasing the capacity of said weighing mechanism, controlling means for said last named means and extending through the opening and being substantially housed within said recessed portion.

5. A scale including in combination, a housing formed with an opening, a scale mechanism within said housing, controlling means for said mechanism and extending through said opening, said last named means including a movable lever, and means carried by said lever and lying adjacent the edges of said opening to prevent the entrance of foreign matter into said housing.

6. A scale including in combination, a housing formed with a recessed portion having an opening, a weighing mechanism within said housing, a tare mechanism associated with said weighing mechanism, and means controlling said tare mechanism and extending through said opening, said last named means being substantially housed within said recessed portion.

7. A scale including in combination, a housing formed with a plurality of openings and recessed portions adjacent certain of said openings, weighing and registering mechanisms within said housing, controlling means for said mechanisms and extending through said openings, certain of said controlling means being substantially housed within said recessed portions, and bearings provided adjacent certain of said openings and encircling the controlling means adjacent said openings whereby to prevent the entrance of foreign matter into said housing.

8. A scale including in combination a housing formed with a plurality of openings and recessed portions adjacent to certain of said openings, weighing and registering mechanisms within said housing, controlling means for said mechanisms and extending through said openings, certain of said controlling means being substantially housed within said recessed portions.

9. A scale including in combination, a housing, a bed block within said housing, a superstructure extending above and carried by said block, a weighing mechanism supported upon said block, poise means connected with said weighing mechanism and carried by said superstructure, means also carried by said superstructure for actuating a registering mechanism whereby to support the poise and actuating scale mechanisms independently of said housing.

10. In a scale, in combination, a housing, a mounting member within said housing, a weighing mechanism supported upon said mounting member, a superstructure carried by said member, supporting elements associated with said superstructure, and a poise connected with said weighing mechanism and carried independently of said housing by said supporting elements.

11. A scale including in combination, a housing, a mounting member within said housing, a weighing mechanism supported upon said mounting member, a superstructure carried by said member, supporting elements associated with said superstructure, means forming a part of a registering mechanism, actuating means connected with said last named means and said weighing mechanism, and a poise also connected with said weighing mechanism, said registering mechanism, actuating means and poise being carried by said supporting elements and independently of said housing.

12. A scale including weighing and registering mechanisms, said registering mechanism embracing a dial and a pointer movable relative to each other, a pinion connected with one of said last named elements, a rack engaging said pinion, means for preventing a back-lash between said rack and pinion, and means for connecting said mechanisms, said means including a rockable lever and means tending to rock said lever to one direction.

13. A scale including in combination a weighing mechanism embracing a rockingly mounted beam, means providing a counterpoise connected with said beam, a load receiving member connected with said beam, means also associated with said beam for increasing the capacity of the weighing mechanism, a registering mechanism, a pinion connected therewith, a movably mounted rack in engagement with said pinion, and means connecting said rack with said beam.

14. A scale including in combination, a weighing mechanism embracing a rockingly mounted beam, means providing a counterpoise connected with said beam, a load receiving member connected with said beam, means also associated with said beam for increasing the capacity of the weighing mechanism, a registering mechanism, a pinion connected therewith, a movably mounted rack in engagement with said pinion, means connecting said rack with said beam, and means connected with said beam for dampening the action of all of said mechanisms.

15. A scale including in combination, a weighing mechanism embracing a rockingly mounted beam, means providing a counterpoise connected with said beam, a load receiving member connected with said beam, means also associated with said beam for increasing the capacity of the weighing mechanism, a registering mechanism, a pinion connected therewith, a movably mounted rack in engagement with said pinion, means connecting said rack with said beam, and a tare mechanism associated with said weighing mechanism.

Signed at Hartford, Connecticut, this 9th day of June, 1924.

LOUIS A. OSGOOD.

Signed at Springfield, Ohio, this 3rd day of July, 1924.

ELMER E. WOLF.